United States Patent [19]

Lakoski

[11] Patent Number: 5,651,457
[45] Date of Patent: Jul. 29, 1997

[54] HOLDER AND SELECTOR APPARATUS FOR DATA DISKS

[76] Inventor: Robert P. Lakoski, 5417 Shoalwood Ave., Austin, Tex. 78756

[21] Appl. No.: 500,746

[22] Filed: Jul. 11, 1995

[51] Int. Cl.$^6$ .................................................. B65D 85/30
[52] U.S. Cl. ..................... 206/308.1; 206/485; 312/9.48; 312/9.55
[58] Field of Search .............................. 206/307.1, 308.1, 206/308.3, 485, 307, 309, 313; 320/311, 345; 312/9.9, 9.47, 9.48, 9.53, 9.54, 9.55, 9.56, 9.64, 234.3, 322

[56] References Cited

U.S. PATENT DOCUMENTS

| | | | |
|---|---|---|---|
| 3,812,960 | 5/1974 | Falletta et al. | 312/9.55 |
| 4,162,006 | 7/1979 | Wilson | 206/308.3 |
| 4,717,019 | 1/1988 | Ackeret . | |
| 4,722,034 | 1/1988 | Ackeret | 312/234.3 |
| 4,807,749 | 2/1989 | Ackeret . | |
| 4,875,743 | 10/1989 | Gelardi et al. | 206/308.1 |
| 4,877,130 | 10/1989 | Matuz . | |
| 5,050,734 | 9/1991 | Chen . | |
| 5,183,177 | 2/1993 | Yu . | |
| 5,191,977 | 3/1993 | Markovitz . | |

FOREIGN PATENT DOCUMENTS

| | | |
|---|---|---|
| 2587974 | 4/1987 | France . |
| 60-20372 | 2/1985 | Japan . |
| 1116701 | 6/1968 | United Kingdom . |
| 2226810 | 11/1990 | United Kingdom . |

*Primary Examiner*—Paul T. Sewell
*Assistant Examiner*—Nhan T. Lam
*Attorney, Agent, or Firm*—Akin, Gump, Strauss, Hauer & Feld, L.L.P.

[57] ABSTRACT

A holder for plural data storage disks comprises a box-like enclosure having end walls and a bottom wall with aligned sets of channels to form plural slots for receiving multiple data storage disks supported side-by-side in the enclosure and held spaced apart from each other. The enclosure includes a movable cover member having a closure part to prevent inserting or removing a disk with respect to the enclosure and a selector part having a slot formed therein which may be aligned with a selected disk receiving slot in the enclosure to insert or remove the selected disk. The cover member may be latched in a closed position by a hinged connection between the closure part and the selector part which permits latching the selector part in a position of the closure part covering all of the disk slots in the enclosure. Cooperating detent projections and recesses on the enclosure and the cover member provide for positioning of the selector part align its slot with the desired disk storage slot to remove or insert the disk with respect to the enclosure.

14 Claims, 3 Drawing Sheets

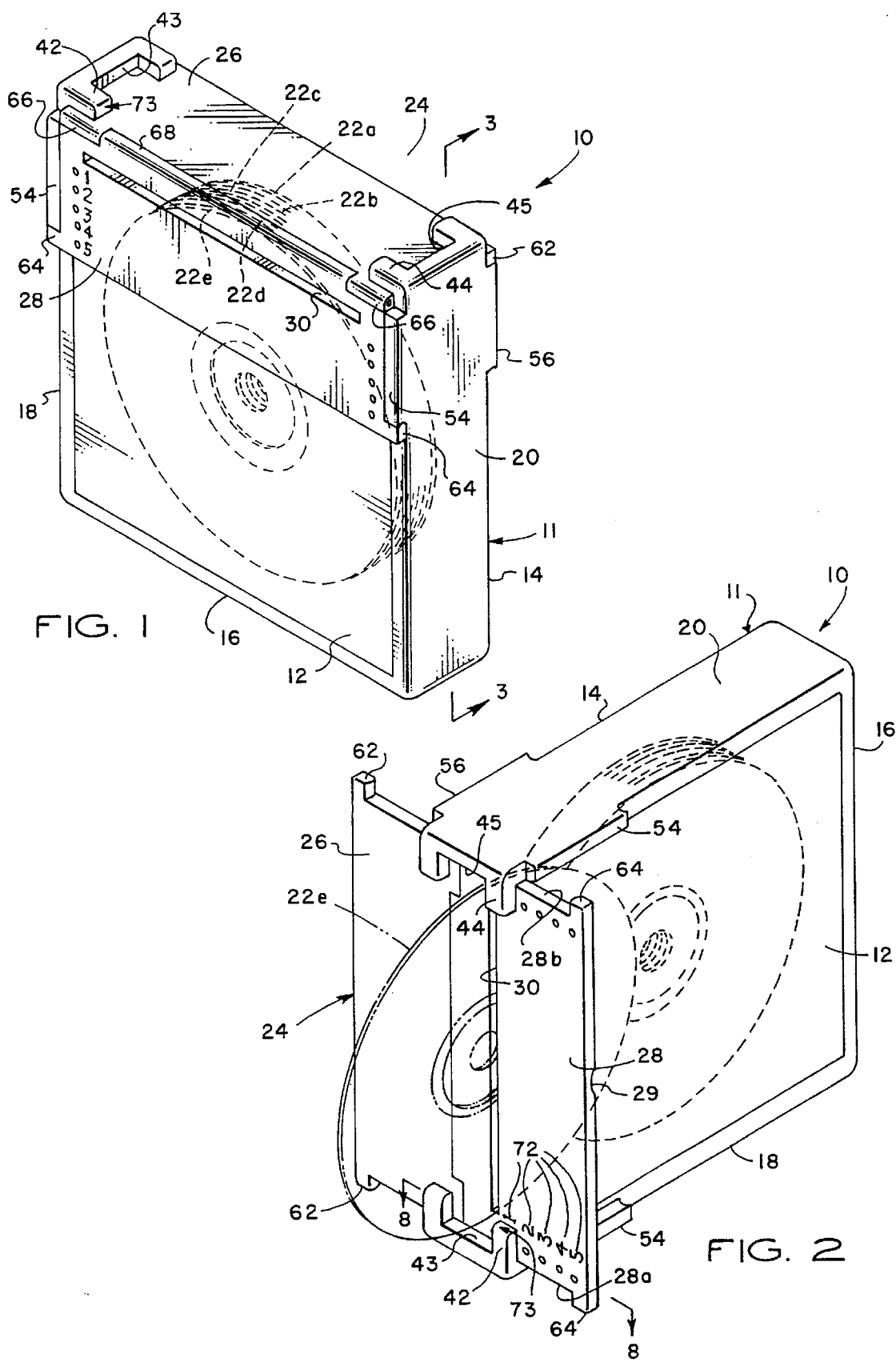

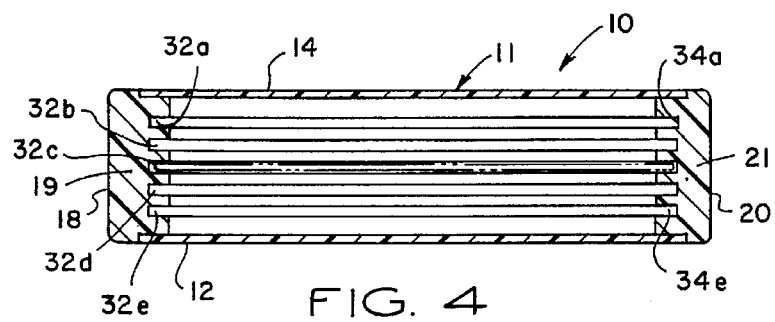
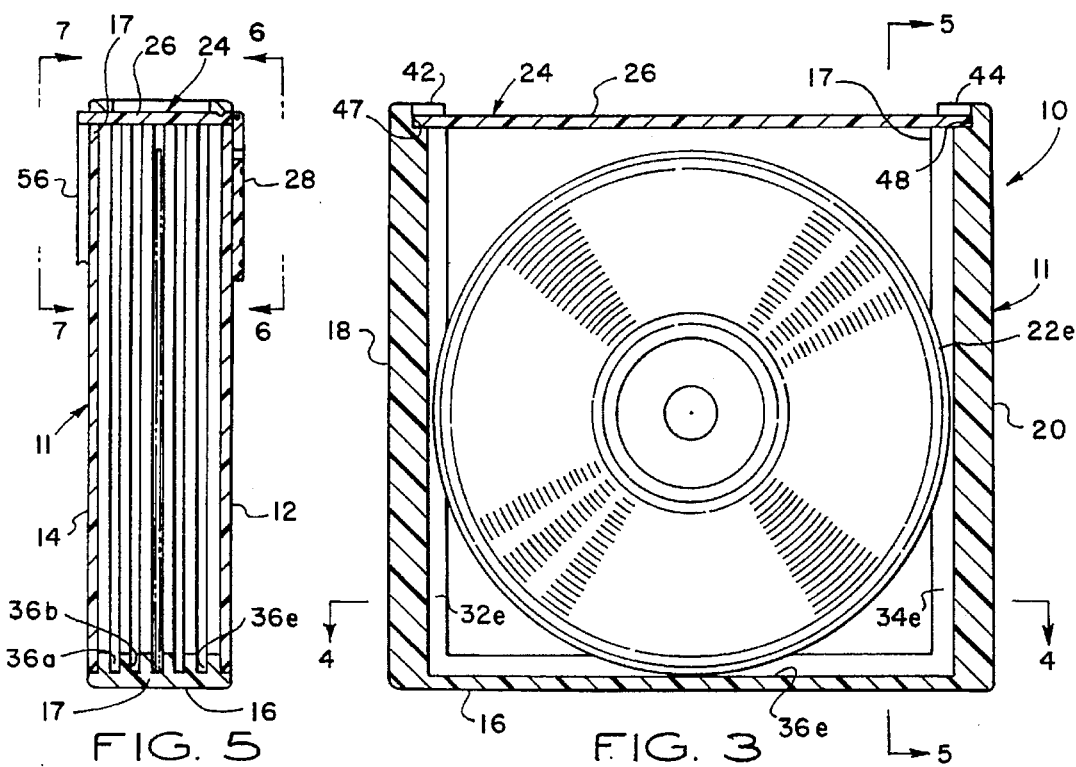
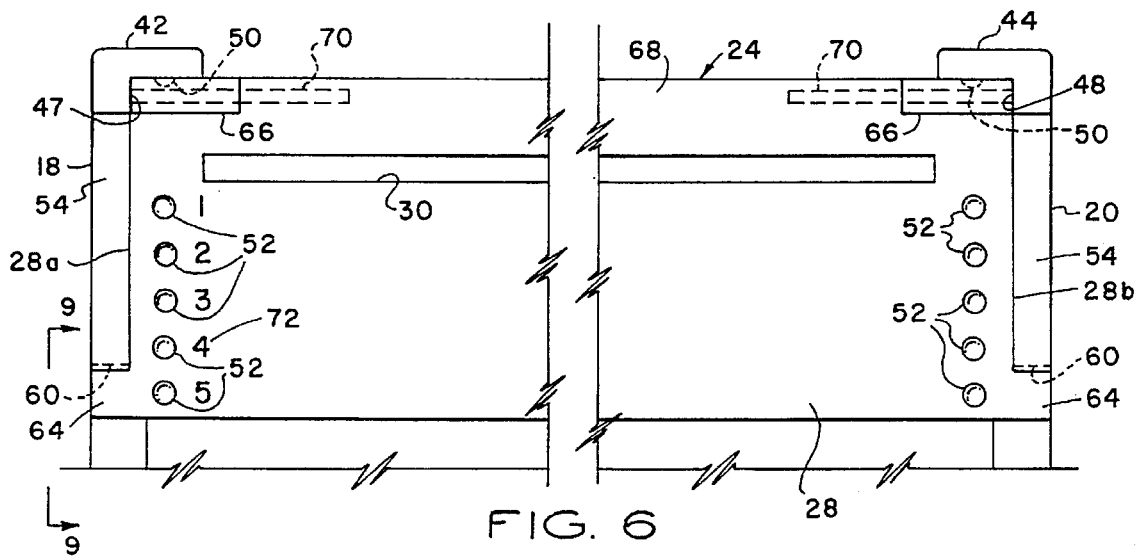

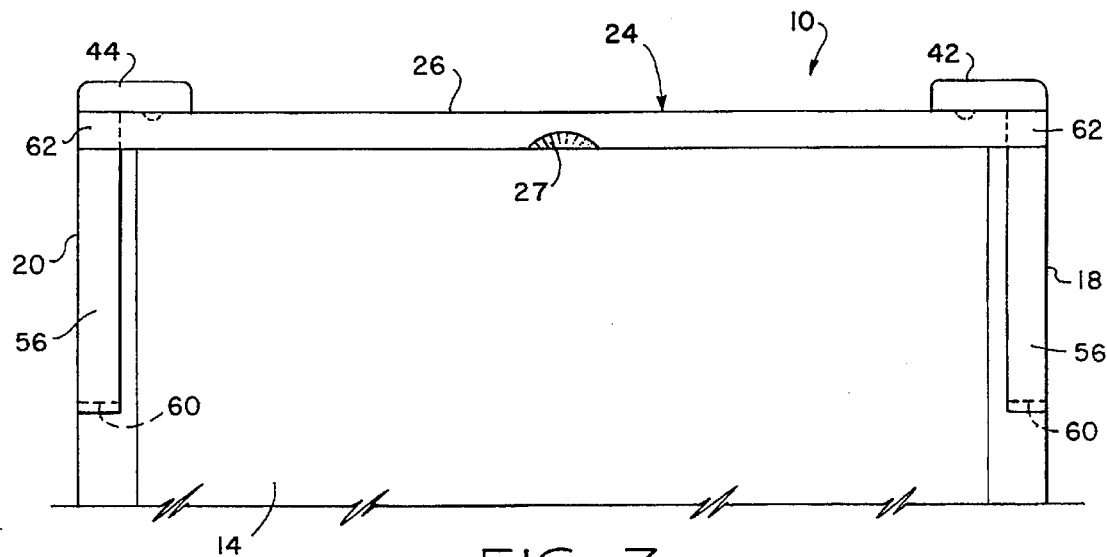
FIG. 7
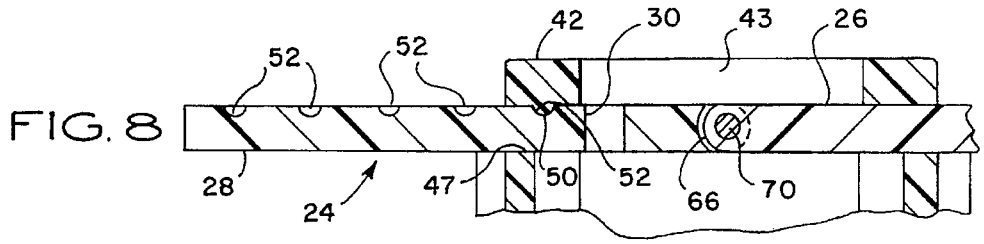
FIG. 8
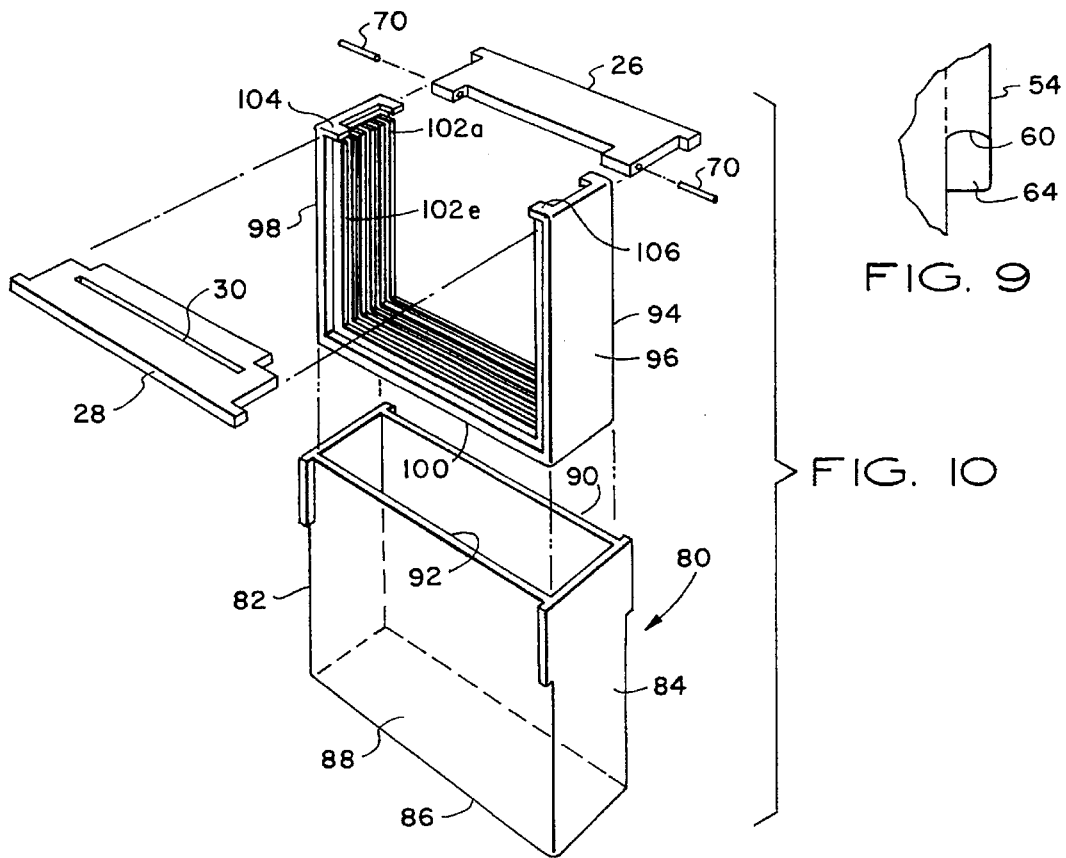
FIG. 9
FIG. 10

HOLDER AND SELECTOR APPARATUS FOR DATA DISKS

FIELD OF THE INVENTION

The present invention pertains to a holder for multiple data storage disks having a movable cover for inserting or dispensing a selected disk with respect to the holder.

BACKGROUND

Electronic data storage disks, sometimes referred to as compact disks or "CDs", are becoming ubiquitous as a medium for storing computer programs, computer generated data and audio and visual recordings, for example. The proliferation of electronic data disks has brought on a need for improved packaging and storage apparatus wherein multiple disks may be stored in a "holder" which may be conveniently transported or simply used for storage of the disks in an organized manner in a display, a library or in the vicinity of a machine with which the disks will be used. Moreover, many applications of data storage disks require the use of multiple disks which are preferably stored in a particular order. Complex computer programs, reference works and cumulative data stored on disks require storage of the disks in an organized manner. Still further, it is often desirable to store disks containing audio and visual recordings in an organized manner so that they may be selectively retrieved for insertion in an audio or visual signal transmitting device.

Accordingly, there has been a growing and strongly felt need for a data disk holder and dispenser apparatus wherein multiple data disks may be stored and selectively retrieved from the holder apparatus for their intended use. It is to these ends that the present invention has been developed.

DESCRIPTION OF THE PRIOR ART

Containers or holders for storing data disks have been developed which include separate slots for receiving individual data disks or for receiving individual storage cases for each data disk. Such storage containers may have multiple spaced apart slots and a closure or cover member which must be moved to a completely open position so that all or more than one of the disks stored in the container or holder may be removed therefrom including the disk selected for removal. Such an arrangement increases the difficulty of selecting the proper disk or disk case for removal. In containers which provide for storing the individual data disk cases, each case must be removed from the storage container and the disk removed from the case. This arrangement is somewhat cumbersome and time consuming and, if the empty case is not replaced in the proper position, it is difficult to determine which is the proper case for removal from the container for replacement of the data disk therein.

Disk storage holders have also been developed which provide for selecting a predetermined disk storage slot for insertion of a disk in or removal of a disk from the holder. However, these prior art holders do not provide a closure for the holder container to prevent removal of any disk, nor do these prior art containers provide a substantially complete closure to minimize contamination or damage to the disks stored therein.

SUMMARY OF THE INVENTION

The present invention provides a unique holder for multiple data storage disks which provides superior protection for the disks, maintains the disks separated from each other in an organized manner and provides for dispensing only the disk that is desired to be removed from the holder.

In accordance with one important aspect of the invention, a holder is provided for multiple data storage disks which forms a complete enclosure for the disks, maintains the multiple disks securely disposed in the holder and separated from each other and includes a sliding closure or cover which may be positioned for inserting a selected disk in or removing a selected disk from the holder. The sliding cover includes a disk selector part having an elongated slot formed therein which may be aligned with a selected disk stored in the holder or with a designated slot in the holder for removal or insertion of a selected disk with respect to the designated slot, respectively. The selector part may be positioned and retained in alignment with the designated slot by unique detent means.

Still further, the invention provides a holder for multiple data storage disks which includes a cover forming a complete closure for the holder to prevent removal of any of the disks therefrom, which cover has a hinged disk selector part with a slot formed therein for positioning the cover in a selected position for inserting and/or removing a disk from the holder, respectively. The disk selector part is hinged to a closure part of the cover in a manner wherein the disk selector part may be placed in a folded or stored position and suitably retained therein by unique latch means formed on the selector part and on the holder, respectively.

In accordance with yet a further aspect of the present invention, a holder for multiple data storage disks is provided which comprises a generally rectangular box-like enclosure having means therein for holding multiple disks securely within the enclosure and spaced from each other to maintain the disks free of contamination and substantially free of risk of damage from being dropped or struck by an object. The holder may be provided with a removable insert having a predetermined number of slots for storing a preselected number of disks.

Those skilled in the art will further appreciate the above-mentioned features and advantages of the present invention together with other superior aspects thereof upon reading the detailed description which follows in conjunction with the drawing.

BRIEF DESCRIPTION OF THE DRAWING

FIG. 1 is a perspective view of the disk holder of the present invention;

FIG. 2 is a perspective view of the disk holder showing a typical position of the holder for removing a selected disk therefrom;

FIG. 3 is a section view taken generally along the line 3—3 of FIG. 1;

FIG. 4 is a section view taken along the line 4—4 of FIG. 3;

FIG. 5 is a section view taken generally along the line 5—5 of FIG. 3;

FIG. 6 is a partial side elevation taken generally from the line 6—6 of FIG. 5;

FIG. 7 is a partial side elevation taken from the line 7—of FIG. 5;

FIG. 8 is a section view taken generally from the line 8—8 of FIG. 2;

FIG. 9 is a detail view taken from line 9—9 of FIG. 6; and

FIG. 10 is an exploded perspective view of an alternate embodiment of an enclosure for the disk holder in accordance with the invention.

DESCRIPTION OF THE PREFERRED EMBODIMENTS

In the description which follows, like parts are marked throughout the specification and drawing with the same reference numerals, respectively. The drawing figures are not necessarily to scale in the interest of clarity and conciseness.

Referring to FIG. 1, a disk holder in accordance with the present invention is illustrated and generally designated by the numeral 10. The disk holder 10 is preferably characterized by a generally rectangular box enclosure 11 having opposed sidewalls 12 and 14, a bottom wall 16 and opposed end walls 18 and 20. The disk holder 10 is adapted to hold a plurality of data storage disks 22a, 22b, 22c, 22d and 22e disposed in the holder and securely retained therein spaced apart from each other in a way which prevents substantial movement of the disks and prevents the disks from contacting each other.

The holder 10 includes a unique combination cover and disk selector member, generally designated by the numeral 24. The cover member 24 includes a closure part 26 forming a cover across a top opening of the holder 10 opposite the bottom wall 16, in the position shown in FIG. 1, to prevent removal of any of the disks from the holder and to substantially prevent contamination of disks stored in the enclosure 11. The cover member 24 also includes a disk selector part 28 which is hinged to the closure part 26 and is movable from a stored position, as shown in FIG. 1, to a position shown in FIG. 2 wherein a selected disk 22e, for example, may be dispensed from the holder 10 through an elongated slot 30 formed in the selector part 28.

The selector part 28 may be moved to plural selected positions in alignment with respective ones of the disks 22a through 22e, when they are stored in the holder 10, to allow removal of the selected disk, such as the disk 22e shown in FIG. 2, which is being removed through the slot 30 by tilting the holder 10 generally into the position shown. Accordingly, only the selected disk 22e, for example, is operable to be inserted in or removed from the holder 10 regardless of its position as long as the cover member 24 is positioned with its selector part 28 aligned with the storage position for the disk 22e. When a disk has been removed from the holder 10, the cover member 24 may be moved back to the position shown in FIG. 1. Of course, when it is desired to replace the disk 22e in the holder 10, the cover member 24 is moved back to the position shown in FIG. 2 with the slot 30 aligned with the enclosure 11 in such a way that the disk 22e may be replaced in its designated position within the holder. Any one of the other disks may be inserted in and removed from the enclosure 11 by suitable alignment of the selector part 28 with the selected disk.

Referring now to FIGS. 3, 4 and 5, a preferred configuration of the disk holder 10 is illustrated in further detail, particularly with respect to the construction of the enclosure 11 The end walls 18 and 20 may be of substantially identical construction and are each characterized by base portions 19 and 21, respectively, having plural, parallel, elongated channels 32a through 32e and 34a through 34e, formed therein, respectively, see FIG. 4. The bottom wall 16 includes a base portion 17 and a plurality of elongated parallel channels 36a through 36e formed therein, see FIG. 5. The respective sets of channels 32a through 32e, 34a through 34e and 36a through 36e are aligned to form parallel, spaced apart slots for receiving respective ones of the disks 22a through 22e and for holding the disks within the enclosure 11 spaced apart from each other while allowing very little lateral movement of the disks within the enclosure.

FIG. 3 shows disk 22e disposed between the end walls 18 and 20 and resting in the slot formed by the channels 32e, 34e and 36e. The end walls 18 and 20 and the bottom wall 16 are each also suitably recessed to receive the sidewalls 12 and 14 as shown in FIGS. 4 and 5 so that a substantially smooth walled exterior surface is provided for the enclosure 11. The end of the enclosure 11 opposite the bottom wall 16 includes a generally rectangular opening 17, FIGS. 3 and 5, delimited by the sidewalls 12 and 14 and the end walls 18 and 20. The enclosure walls 12, 14, 16, 18 and 20 may be separately fabricated of metal or, preferably, plastic and secured together by mechanical fasteners, not shown, or by a suitable adhesive to form the enclosure 11. Alternatively, the enclosure 11 may be molded or cast in one piece of a suitable plastic, for example.

Referring again to FIGS. 1 and 2, the end walls 18 and 20 are provided at their upper ends, respectively, with opposed flanges 42 and 44 having respective recesses 43 and 45 formed therein. The flanges 42 and 44 also define respective opposed slots 47 and 48, FIG. 3, for receiving the cover member 24. As shown in FIGS. 6 and 8, the flanges 42 and 44 include partial spherical detent projections 50 extending into the slots 47 and 48. The detent projections 50 are cooperable with spaced apart stops formed by partially spherical recesses 52 disposed adjacent opposite side edges 28a and 28b of the disk selector part 28. The end walls 18 and 20 also have opposed longitudinally extending bosses 54 and 56 formed on opposite sides thereof and generally adjacent the slots 47 and 48, see FIGS. 6 and 7. The lower edges of the bosses 54 and 56 preferably have a slight concave or sloped surface 60 formed thereon, see FIG. 9 by way of example, forming a detent for engagement with opposed latch projections 62 and 64 formed on the respective parts 26 and 28 of the cower member 24, see FIGS. 1, 2, 6 and 7. The latch projections 62 and 64 also retain the cover member 24 on the enclosure 11 slidably disposed between the flanges 42 and 44.

When the cover member 24 is in the position shown in FIGS. 1, 5 and 6, for example, the latch projections 64 may be disposed in the detent recesses 60 of the bosses 54 to retain the selector part 28 in the position shown. The cover part 26 and selector part 28 may be easily snapped in or out of their latched positions and are provided with suitable recesses 27 and 29, FIGS. 7 and 2, for manipulating the parts to release them from a latched position.

Referring further to FIGS. 6 and 8, the cover member 24 includes suitable means for hinging the disk selector part 28 to the cover part 26. The cover part 26 and the disk selector part 28 are generally planar plate-like members and are provided with respective cooperable hinge bosses 66 and 68 which are adapted to have suitable bores for receiving opposed coaxial hinge pins Accordingly, the disk selector part 28 may be moved from the position shown in FIGS. 1 and 5 to a position substantially coplanar with the closure part 26, and the cover member 24 may then be moved to a selected position of the selector part 28 to place the slot 30 in registration with one of the disk retaining slots formed by the respective sets of channels in the end walls 18 and 20 and the bottom wall 16 as described above. The detent projections 50 and the detent recesses 52 are spaced such that the selector part 28 is progressively retained in a position of the slot 30 which will provide for inserting and removing a disk with respect to the selected slot within the enclosure 11 which is aligned with the slot 30.

As shown in FIGS. 2 and 6, suitable indicia 72 may be placed on the cover part 28 adjacent each of the detent recesses 52 to indicate which slot in the enclosure 11 is open for receiving or dispensing a disk through the slot 30. For example, when the appropriate indicia 72 is aligned with corresponding indicia 73, FIG. 2, on one or more of the flanges 42 and 44, then a disk retaining slot within the enclosure 11 is aligned with the slot 30 for receiving or dispensing a disk with respect to the enclosure.

When the slot 30 is in registration with the disk receiving slot formed by the channels 32a, 34a and 36a, the closure part 26 is in a position to be pivoted downwardly and substantially parallel to the sidewall 14 and latched adjacent thereto by registration of the latch projections 62 with the corresponding detent recesses 60 formed by the bosses 56. This position of the selector part 28 may correspond, for example, to the position in which a master disk or the like for a computer program would be kept in the holder 10, when not in use, but since this disk is likely to be used a substantial amount of time, the selector part 28 may be allowed to reside there and moved to a selected position for removing other disks, at will, and then returned to the position wherein the closure part 26 is latched adjacent the side wall 14.

Referring now to FIG. 10, an alternate embodiment of an enclosure for the holder 10 is illustrated in and generally designated by the numeral 80. The enclosure 80 is characterized as a generally rectangular box having opposed end walls 82 and 84, a bottom wall 86 and opposed sidewalls 88 and 90. A rectangular top opening 92 is formed in the enclosure 80 which is adapted to receive a generally U shaped insert 94 having opposed upstanding leg portions 96 and 98 interconnected by a transverse base portion 100. The insert 94 is adapted to be slidably disposed into and suitably secured within the enclosure 80 and includes plural disk receiving slots 102a through 102e, similar to the slots formed by the channels in the end walls and bottom wall of the enclosure 11. The insert 94 also has opposed flange portions 104 and 106 similar to the flanges 42 and 44 and adapted provide opposed slots or guideways to slidably receive the cover member 24, shown in exploded perspective in FIG. 10. Accordingly, a disk holder in accordance with the invention may be fabricated using an enclosure 80 and substituting the insert 94 for another insert with a greater or fewer number of slots for receiving a corresponding number of data disks. In like manner, the disk selector part 28 may be modified to have a greater or fewer number of detent recesses 52 corresponding to the number of slots in the insert 94. In this way, a disk holder may be provided which utilizes a common enclosure but may be adapted for different numbers of disks to be held thereby according to the number of slots in the insert 94 or similar inserts having the corresponding number of disk receiving slots required.

The operation of the disk holder 10 is believed to be understandable to those of skill in the art from the foregoing description. Multiple data storage disks having the standard 4.71 inch outside diameter may be inserted in the respective slots formed in the enclosures 11 or 80 described above by positioning the selector part 28 in registration with the respective slots and placing the disks within the enclosure retained against substantially any movement and retained against contact with an adjacent disk by the respective sets of slots formed by the end walls 18 and 20 and bottom wall 16 or by the insert 94 described above. The channels in the bottom wall 16 may be eliminated, if desired.

When a disk has been inserted in or removed from the holder 10, the cover part 24 may be returned to the position shown in FIG. 1 with the closure part 26 disposed over the top opening of the enclosure and the selector part 28 folded and secured against the enclosure sidewall awaiting the task of removing a disk from or storing a disk in the holder. Thanks to the cooperating detent projections 50 and recesses 52, the slot 30 is advantageously positioned in alignment with the disk receiving slots formed within the enclosure as described above. The flanges 42 and 44, as well as the flanges 104 and 106, are sufficiently elastically deflectable to allow movement of the cover member 24 between detent positions by a moderate force exerted on the cover member to slide it from one detent position to the next, while each projection 50 is forced out of one recess 52 and then is elastically biased back into the next recess as a result of slight elastic deflection of the flanges. Those skilled in the art will recognize that the detent means provided by the projections 50 and the recesses 52 may be modified to place recesses on the flanges 42 and 44, for example, and cooperating projections on the selector part 28. The cooperating detent projections and recesses may also be formed on the longitudinal side edges 28a and 28b of the selector part 28 and the corresponding surfaces of the slots 47 and 48 which are adjacent to those edges.

Although preferred embodiments of the invention have been described in detail hereinabove, those skilled in the art will recognize that various substitutions and modifications may be made to the unique disk holder described herein without departing from the scope and spirit of the invention as recited in the appended claims.

What is claimed is:

1. A disk holder comprising:

an enclosure having opposed sidewalls, opposed end walls and a bottom wall;

disk support means formed in said enclosure defining a plurality of spaced apart disk storage slots for receiving plural data storage disks therein, respectively; and a cover member disposed on said enclosure generally opposite said bottom wall for retaining said disks in said enclosure, said cover member including a generally planar disk selector part including an elongated disk receiving slot formed therein for receiving a selected disk for insertion in or removal from said one of said disk storage slots, said cover member being movable to a position for inserting a selected disk in or removing a selected disk from a disk storage slot through said disk receiving slot, said cover member including a generally planar closure part connected to said selector part by cooperating hinge means and supported on said enclosure for sliding movement between a position of said closure part covering all of said disk storage slots and a position of said selector part aligned with said disk support means for one of inserting a disk in and removing a disk from a selected one of said disk storage slots of said enclosure.

2. The disk holder set forth in claim 1 wherein:

said disk support means comprises an insert operable to be disposed in said enclosure and having plural spaced apart disk storage slots formed therein.

3. The disk holder set forth in claim 1 wherein:

said disk support means comprises spaced apart disk storage slots formed in at least two of said end walls and said bottom wall for supporting respective ones of said disks against substantial movement within said enclosure.

4. The disk holder set forth in claim 1 wherein:

said cover member includes latch means formed thereon for latching said cover member in a position to prevent removal of a disk from said enclosure.

5. The disk holder set forth in claim 4 wherein:

said latch means comprises opposed latch projections on said cover member engageable with cooperating surfaces formed on said enclosure for retaining said selector part and said closure part of said cover member in a closed and locked position of said cover member.

6. The disk holder forth in claim 1 including:

projections formed on opposed ends of said cover member for retaining said cover member on said enclosure.

7. The disk holder set forth in claim 1 wherein:

said end walls include opposed flanges forming opposed slots in said enclosure for receiving said cover member in slidable relationship to and retained on said enclosure.

8. A data disk holder for plural data storage disks comprising:

an enclosure having opposed end walls and a bottom wall and means forming plural, spaced apart, generally parallel disk storage slots for receiving multiple data storage disks supported side by side in said enclosure and held spaced apart from each other;

a cover member supported on said enclosure and movable relative to said enclosure, said cover member including a closure part operable to be positioned on said enclosure to prevent inserting a disk in or removing a disk from said enclosure, said cover member including a selector part connected to said closure part and having a slot formed therein which may be aligned with a selected disk storage slot in said enclosure for insertion of or removal of a disk with respect to said enclosure, said cover member being operable to be positioned in a selected position of said slot in said selector part by cooperating detent means on said cover member and said enclosure for positioning said selector part in alignment of said slot in said selector part with a selected disk storage slot in said enclosure for removal or insertion of a disk with respect to said enclosure, said closure part and said selector part being connected to each other by hinge means for moving one of said closure part and said selector part to a latched position with respect to said enclosure.

9. The disk holder set forth in claim 8 including:

latch means comprising opposed latch projections formed on at least one of said closure part and said selector part and cooperable with means on said enclosure for engaging said projections to retain said cover member in a selected position of said closure part and said selector part, respectively.

10. A disk holder comprising:

an enclosure having opposed sidewalls, opposed end walls and a bottom wall;

disk support means formed in said enclosure for receiving plural data storage disks therein and comprising spaced apart disk receiving slots formed in at least two of said end walls and said bottom wall for supporting respective ones of said disks against substantial movement within said enclosure; and a cover member disposed on said enclosure generally opposite said bottom wall for retaining said disks in said enclosure, said cover member including a disk selector part movable to a position for inserting a selected disk in or removing a selected disk from said enclosure, said selector part including an elongated slot formed therein for receiving a selected disk for insertion in or removal from said enclosure and said cover member including detent means formed thereon for registration with cooperating detent means on said enclosure to position said selector part such that said slot in said selector part is aligned with a selected slot formed in said enclosure for inserting a disk in or removing a disk from said holder.

11. The disk holder set forth in claim 10 wherein:

said detent means comprises cooperating recesses and projections on said cover member and said enclosure for retaining said cover member in a selected position of said selector part.

12. A disk holder comprising:

an enclosure having opposed sidewalls, opposed end walls and a bottom wall, said end walls including opposed flanges forming opposed slots in said enclosure for receiving a cover member in slidable relationship to and retained on said enclosure;

disk support means formed in said enclosure for receiving plural data storage disks therein;

a cover member disposed on said enclosure generally opposite said bottom wall for retaining said disks in said enclosure, said cover member including a disk selector part movable to a position for inserting a selected disk in or removing a selected disk from said enclosure; and detent means formed on said flanges and said cover member for retaining said cover member in a selected position with respect to said enclosure for inserting a disk in and removing a disk from said disk support means.

13. The disk holder set forth in claim 12 wherein:

said detent means comprises cooperating projections and recesses on said flanges and said cover member, said projections being registrable with said recesses for positioning said cover member in a selected position for inserting a disk in and removing a disk from said holder.

14. A disk holder comprising:

an enclosure including means forming a plurality of spaced apart slots for receiving a plurality of data disks within said enclosure spaced apart from each other, said enclosure having an opening formed therein for placing said disks in and removing said disks from said slots;

a cover member disposed on said enclosure for covering said opening and including a selector part movable into alignment with a selected one of said slots to permit insertion of a disk in and removal of a disk from said selected slot; and stop means on said enclosure cooperable with said cover member for positioning said cover member in a position to insert a disk in or remove a disk from said selected slot, said stop means comprising cooperating detent means formed on said cover member and said enclosure for positioning said cover member with respect to said enclosure to provide for inserting a disk in and removing a disk from said selected slot.

* * * * *